(12) United States Patent
Ravagni et al.

(10) Patent No.: US 6,452,081 B1
(45) Date of Patent: Sep. 17, 2002

(54) STRINGED INSTRUMENT FINGER POSITIONING GUIDE AND METHOD FOR TEACHING STUDENTS TO READ MUSIC

(76) Inventors: Steven F. Ravagni, 22219 SE. 134th St., Issaquah, WA (US) 98027; Nicholas D. Ravagni, 22219 SE. 134th St., Issaquah, WA (US) 98027; Patricia M. Ravagni, 22219 SE. 134th St., Issaquah, WA (US) 98027

( * ) Notice: Subject to any disclaimer, the term of this patent is extended or adjusted under 35 U.S.C. 154(b) by 0 days.

(21) Appl. No.: 09/858,234

(22) Filed: May 15, 2001

Related U.S. Application Data (60) Provisional application No. 60/205,319, filed on May 18, 2000.

(51) Int. Cl.$^7$ .............................................. G09B 15/02
(52) U.S. Cl. ................. 84/477 R; 84/485 R; 84/464 A; 84/464 R
(58) Field of Search ............................... 84/477 R, 478, 84/485 R, 483.1, 464 A, 464 R (56) References Cited

U.S. PATENT DOCUMENTS

| | | | | |
|---|---|---|---|---|
| 3,429,216 A | * | 2/1969 | Lawrence | 84/471 R |
| 3,562,394 A | * | 2/1971 | Kiepe | 84/678 |
| 4,791,848 A | * | 12/1988 | Blum, Jr. | 84/453 |
| 4,807,509 A | | 2/1989 | Graham | |
| 4,915,005 A | * | 4/1990 | Shaffer et al. | 84/314 R |
| 5,266,735 A | | 11/1993 | Shaffer | |
| 5,408,914 A | | 4/1995 | Breitweiser | |
| 5,576,505 A | | 11/1996 | Linhart | |
| 5,796,025 A | * | 8/1998 | Haake | 84/464 R |
| 5,920,023 A | | 7/1999 | Ravagni | |
| 6,162,981 A | * | 12/2000 | Newcomer et al. | 84/485 R |
| 6,191,348 B1 | | 2/2001 | Shaffer | |
| 6,218,603 B1 | * | 4/2001 | Coone | 84/485 R |

OTHER PUBLICATIONS

"Light Emitting Polymers—Technical Background" Cambridge Display Technologies, Ltd.
"LEP for Full Color Displays" LEP chromaticity Cambridge Display Technologies, Ltd.
"Features and Benefits of LEP Technology" Cambridge Display Technologies, Ltd.

* cited by examiner

Primary Examiner—Shih-Yung Hsieh (57) ABSTRACT

The present invention is directed to a device for teaching students of stringed instruments note locations and proper finger placement on the fingerboard of the instrument. The device may be adapted for use with either a fretted or non-fretted instrument. The device comprises a sheet of autogenously adhesive plastic, such as cling vinyl, within which is a set of dynamically operated markers such as LED lamps or other electro-luminescent devices for indicating fingering locations for scales or chords. Music from any source such as a recording, microphonic pickup, synthesizer, MIDI equipment, or instrument pickups, or the like is the data input to a computer program which can denature the source music into essential components which are then reconstructed into the tonal patterns of a target instrument such as a guitar. The synthetic target instrumental music is then rendered into one or more analogs, such as a score displayed on the computer screen, recorded in the computer memory, a MIDI output, a printed score, and most importantly, to dynamically drive a set of illuminated "dots" removably attached to the finger board of a stringed instrument, thereby showing the novice player or other exactly where to place his fingers to produce the proper notes.

15 Claims, 5 Drawing Sheets

STRINGED INSTRUMENT FINGER POSITIONING GUIDE AND METHOD FOR TEACHING STUDENTS TO READ MUSIC

RELATED APPLICATIONS

The present invention claims benefit of Provisional Application No. 60/205,319 titled "A MUSIC TRAINING SYSTEM", filed on May 18, 2000.

The present invention is an improvement on U.S. Pat. No. 5,920,023 by Steven Ravagni, et al. U.S. Pat. No. 5,920,023 is hereby incorporated by reference.

BACKGROUND OF THE INVENTION

1. Field of the Invention

The present invention relates to devices and methods for teaching a student to play a fretted or non-fretted stringed instrument. More particularly, the present invention is directed to devices for teaching a student note or chord names, and proper finger placement to play individual notes, chords or scales, on a fretted or non-fretted stringed instrument, and to an improved method for teaching a student of a stringed instrument to read music.

It also pertains to the art of composing, translation, and scoring music as original composition or derived from recordings, sheet music, and the like.

2. Description of the Prior Art

U.S. Pat. No. 5,920,023 by Ravagni et al, is a passive guitar finger guide composed of autogenously adhesive (clinging plastic) thin sheet stock with the fingering positions printed on the one surface. The present invention replaces the fixed printed indicia of 023 with dynamic indicia under control of a computer or other memory containing logic-machine. The indicia are luminous lamp devices such as LED's and electro-luminescent devices, or non-luminous devices such as liquid crystal displays and electro-optical shutters over reflective ink, dye, or paint spots.

Both fretted and non-fretted stringed instruments, including but not limited to guitars, ukuleles, banjos, balalaikas, dulcimers, sitars, violins, violas, and cellos, comprise the following parts: a sound box or board having a sound hole or "f" holes, a neck and fingerboard, a nut, a head and tuning pegs, strings, and a bridge. Instruments such as violins, violas and cellos also have a tailpiece which anchors the strings. On a stringed instrument, the strings extend from the tailpiece, or bridge if no tailpiece is present, to the tuning pegs, and are raised above the fingerboard by the bridge and nut. The fingerboard of a fretted instrument, such as a guitar or banjo, has raised, longitudinally transverse bars called "frets" positioned at spaced intervals along the length of the fingerboard. The fingerboard of a non-fretted instrument, such as a violin, viola or cello, is flat and smooth, having no frets.

In play, the tone of a particular string of a fretted or non-fretted stringed instrument is changed by changing the length of the string. When a string is depressed against the fingerboard between two frets, the depressed string contacts the frets on either side of the point of depression to change the harmonic vibration of the string, and thus change the tone of the string. The length of the string is changed on non-fretted instruments by finger pressure along the length of the string, placing the string in contact with the fingerboard. On either a fretted or non-fretted stringed instrument, different notes are sounded by strumming, glancing, picking, or bowing the strings with one hand, or a bow or like instrument, while the fingers of the other hand depress the strings against the fingerboard. Strumming, glancing, picking, or bowing a single string will create a single note. Strumming or bowing several strings simultaneously or in rapid succession so that several notes are sounded in unison, creates a chord. Generally, to play a chord, several strings must be depressed at various positions along the neck. An "open string" (a string which has not been depressed) may also form part of a chord. Chords may be played on both fretted and non-fretted stringed instruments.

When learning to play a stringed instrument, a student must learn at what point along the length of the fingerboard the string must be depressed to play a particular note, and a student must learn to read music so that he or she recognizes the written note. Particularly in the case of fretted instruments, a student must also learn which notes comprise a particular chord, learn the names of the chords, and, preferably, learn to read the written notes comprising the chords. Thus, a beginning student must learn a significant amount of information, including the parts of the instrument, note names, note locations on the fingerboard, and the construction of written music, and must expend a significant amount of time and effort before the student can obtain satisfaction from his or her efforts.

To encourage the beginning stringed instrument student and accelerate the process of learning to play notes, chords and scales, and learning how to read music, a variety of teaching devices have been employed. However, many of these devices have significant shortcomings, making them ineffective or unappealing to use. Ravagni's 023 patent reviews several prior art teaching aids of the fixed indicia type.

Dynamic or lighted indicia are the subject of several other patents. Representative of this genera are U.S. Pat. No, 5,408,914 by Frederick Breitweiser et al, U.S. Pat. No. 6,191,348 by Steven Johnson, U.S. Pat. No. 5,266,735 and U.S. Pat. No. 4,915,005 by John R Shaffer, U.S. Pat. No. 4,807,509 John F Graham, and U.S. Pat. No. 5,576,505 by Gair Linhart.

All except the Linhart patent show indicators and wiring built into the instrument. That is, the instrument is specially constructed or physically modified at the factory for installation of the indicating system before delivery to the musician. This raises the cost, makes the instrument "special purpose" and suggests limited production runs., short product life and repair implications thereby raising the cost of ownership. Furthermore, cutting or modifying the standard design for an instrument may compromise the strength and/or sound quality expected from an instrument The Linhart patent discloses that the indicator lights are removably attached by hook-and-loop fasteners (Velcro). Even these require one part of the fastening system to be fixedly attached to the instrument, likely by adhesive which may or may not leave marring or residue when removed.

The present invention is installed by the musician without nails, pins, adhesives, or cutting, and when removed, the instrument is completely restored to its original condition. Thus the present invention can be used on valuable, heirloom, historic, or showpiece musical instruments. Further, the same instrument may be used for learning and after its mastery.

OBJECTS OF THE INVENTION

It is an object of the invention to provide a removable chord and note display without requiring attachment devices, adhesives, or modification to the instrument or mar the finish of the instrument.

It is a further object of the invention to dynamically indicate the locations of finger positioning for playing notes, chords, or melodies on a stringed instrument.

It is a further object of the invention to provide a static display of the fingering positions for playing notes and chords in any usable key on a stringed instrument.

It is a further object of the invention to analyze a performance of music, translate it to the subject stringed instrument, and dynamically indicate the finger locations.

It is a further object of the invention to dynamically produce a display and record a music staff with notes of a performance of music.

It is a further object of the invention to re-play the record of music.

AN INDEX OF THE DETAIL IDENTIFIERS

1. Guitar fingering guide
2. Computer with program
3. Interface driver
4. Music source
5. Speaker system
6. Finger position indicators
7. Interconnecting cable
30. Prior art fingering guide
32. Base sheet of prior art
34. Printed indicia in prior art
36. Fret slots in prior art
41. Indicia carrying area
42. Dynamic indicia
43. Fret slots
44. Wrap area wings
45. Wiring representation
46. Base sheet
50. Light emitting cell
51. Transparent substrate
52. Transparent positive electrode
53. Positive photo electric layer
54. Negative photo electric layer
55. Negative electrode
56. Negative wiring contact
57. Positive wiring contact
58. Light emission direction
59. Autogenously adhesive bottom layer
60. Guitar
61. Strings
62. Nut
63. Frets
64. Neck

A BRIEF SUMMARY OF THE INVENTION

An assembly of layers forming a flexible sheet having autogenously adhesive properties and having at least one layer of electrically operated indicators and associated wiring which dynamically identify the fingering positions for depressing the strings to produce various scale notes and chords when the strings are plucked or bowed.

The indicators are electrical lamps, electrically operated light shutters, or the distal end of fiber optic light-pipes. The indicators are powered through a set of computer operated switches and may be turned on continuously to simultaneously show all the notes and chords for a particular key, or the notes and chords may be flashed in sequence corresponding to the notes of a score or played selection of music. In the latter case, the player follows the fingering instructions as displayed sequentially.

A source of music, which may be a recording, microphonic pickup of live orchestral performance, synthesizer, MIDI equipment, or instrument pickup "microphones", or the like is the data input to a computer program which can denature the source music into essential components which are then re-constructed into the tonal patterns of the target instrument such as a guitar. The synthetic target instrumental music is then rendered into one or more analogs, such as a score displayed on the computer screen, recorded in the computer memory, a MIDI output, a printed score, and most importantly, to dynamically drive a set of illuminated "dots" attached to the finger board of a stringed instrument, thereby showing the novice player or other exactly where to place his fingers to produce the proper notes.

DETAILED DESCRIPTION OF THE INVENTION

Figure 1:
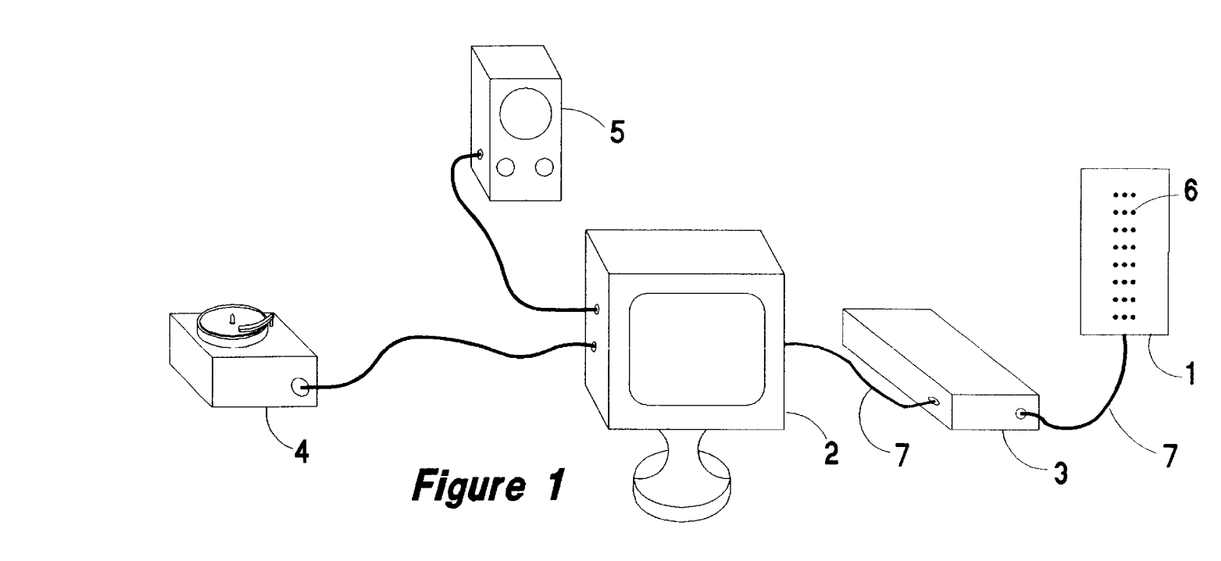
FIG. 1 is a diagram of the music training system
Figure 2:
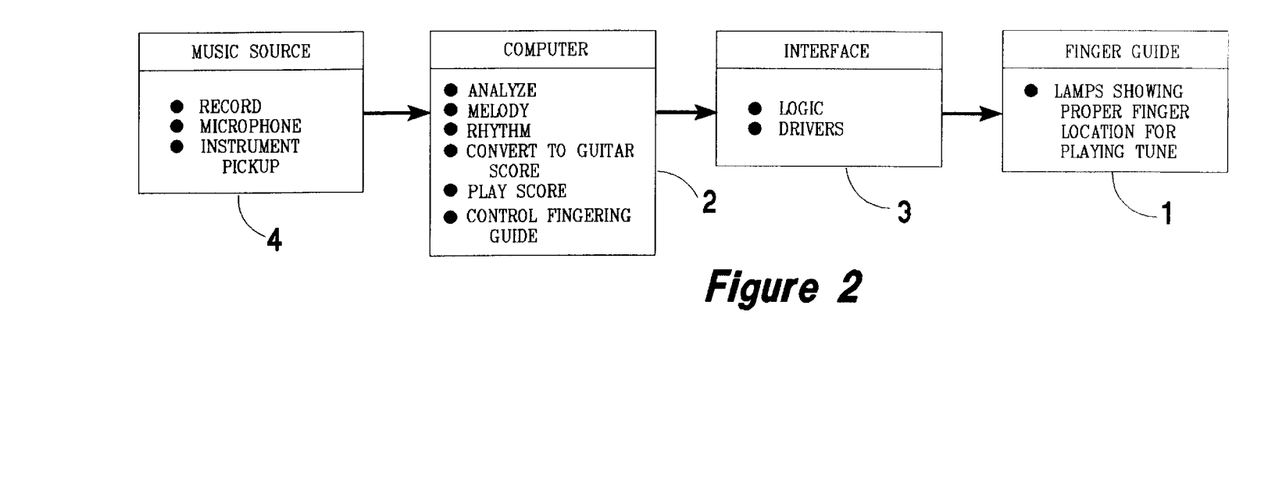
FIG. 2 is a block diagram of the music training system.

Referring to FIG. 1, the finger guide 1 of the present invention is similarly constructed with the passive (printed) finger positioning indicators of the prior art replaced by light sources 6, liquid crystals, light shutter in front of a reflective surface, fiber optic light guide, or the like, which are operated by signals from computer 2. An interface driver 3 is provided when there are no computer output ports compatible with the electrical switching and power requirements of the finger guide module 1.

The wiring 45 within the active finger guide 1 is constructed using any of several known flexible circuit board techniques. The interconnection of the indicator spots 42 and the driver may be any of several known display operating circuits such as a common return and individual wiring to each indicator, a plurality of commons and individual wiring to each indicator, a row-and-column selected XY matrix, or a combination of these. The exact circuit details depends on the type of indicator technology used as well as the mode of selection to energize an indicator location. However, these are well known in the industry and the manufacturers of products using the indicator technologies make public recommendations of techniques best suited for their particular technology.

A plug between the cable 7 and the guide wiring 45 is optional. Of course, adequate mechanical securing is required.

Computer 2 in cooperation with a suitable program performs the following functions singly or in combination simultaneously or sequentially:

analyze the music, extracting the rhythm and melody producing a score in memory translates the score into guitar format drives the guitar fingering guide indicators records the score(s) in memory plays the score(s) on the speakers prints the score on the screen and/or paper.

The driver interface 3 is conventional and contains appropriate code/decode and level shifting to match the computer output (usually a standard parallel or serial port) to the indicators. As previously described, the driver may be implemented in hardware or software, be internal to the computer, or any combination suitable for energizing the indicia.

Speaker(s) 5 are to play music stored or generated by the computer.

The music source 4, is shown as a generic record player, but includes any electrical rendition of played music or it may be a computer file of a score. Typical would be a microphone, disk player, tape player, instrument pickup, MIDI signal, radio, WAV or MP2 file, and the like, or a data file containing information equivalent to printed sheet music.

The indicator element 1, is a layer or composite of sub-layers containing the wiring and indicators further comprising at least an overlapping portion which wraps around the finger board and having autogenous adhesive properties. In general, the surface adjacent to the finger board and guitar neck will also have autogenous adhesive properties to provide better adhesion for securing the fingering guide assembly around a guitar neck.

The present invention is of similar size, shape, adhesion, and indicator positions as the prior art fingering guide of prior art U.S. Pat. No. 5,920,023 as shown in FIG. 3.

The guitar fingering guide of the 023 patent is constructed from a elastomeric material, such as flexible plastic, which may be cast in sheet form and cut to fit the specific instrument of interest. Suitable plastics may include highly plasticized poly vinyl chloride, polyurethanes, morthanes, or other thermoplastic synthetic rubber compounds.

Figure 3:
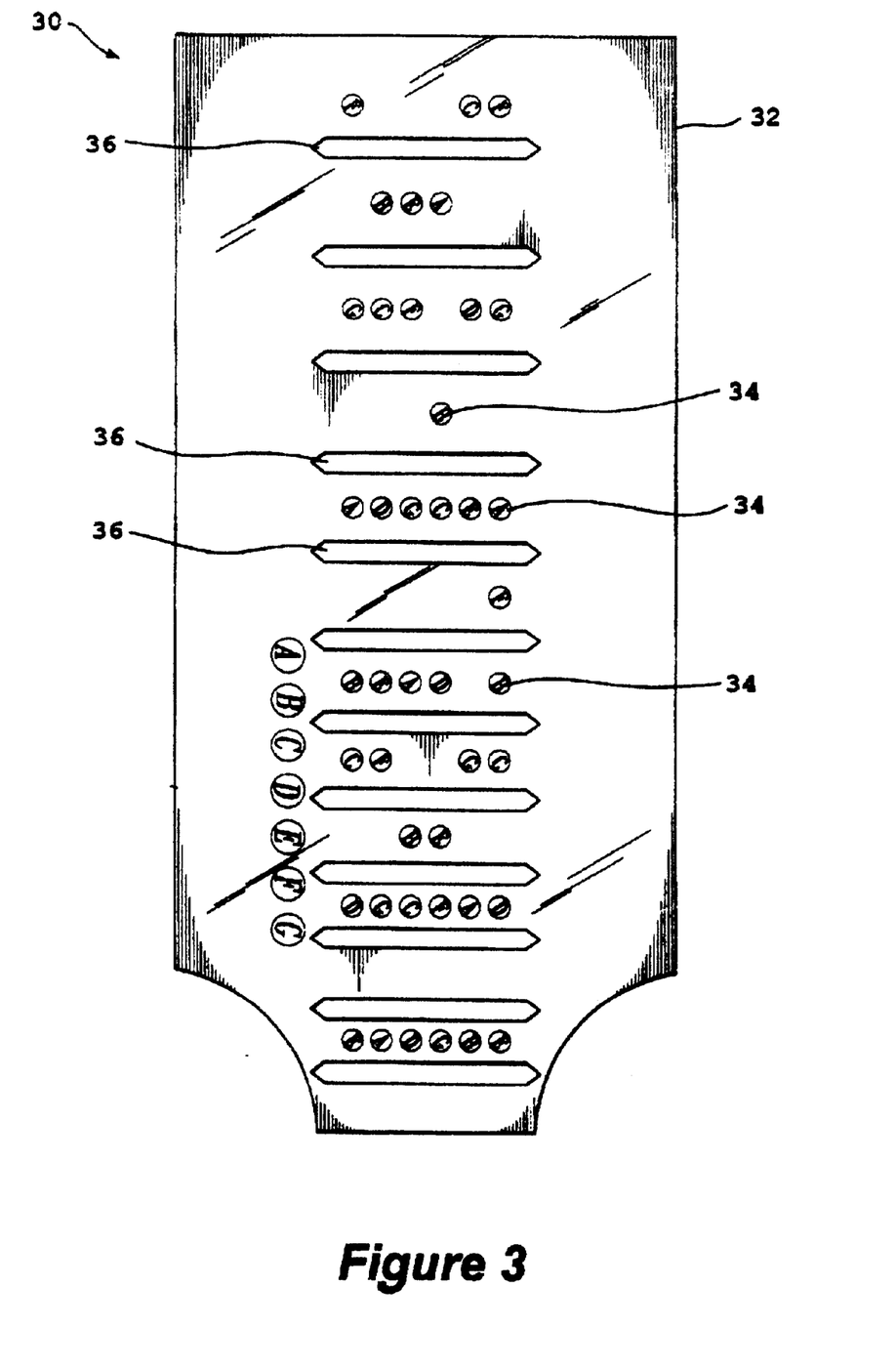
FIG. 3 shows the prior art disclosed in U.S. 023.

Referring to FIG. 3, the 023 prior art invention, various colored finger positioning indicia 34 are printed on the upper surface of the guide 30. Guide 30 is constructed on a base sheet of autogenously adhesive or self adhering plastic sheet 32, such as "cling vinyl". For guitar use, fret slots 36 are cut into the base sheet 32. Cling vinyl is a highly plasticized polyvinyl chloride material. One presently preferred cling vinyl for constructing the guide 30 of the present invention is FLEXMARK CV-800-CTC-245 70 PW cling vinyl manufactured by Flexcon of Spencer, Mass. One thermoplastic synthetic rubber compound suitable for use in constructing the guide of the present invention is commercially available from the GLS Company under the trademark DYNAFLEX. Another plastic contemplated for use is a Morthane brand aliphatic thermoplastic polyurethane from Morton International. The materials employed and identified as aliphatic thermoplastic polyurethanes may be polyether based or polyester based, and the Morthane.RTM. line of polyether-based and polyester based aliphatic thermoplastic polyurethanes are particularly suitable for the purposes of the present invention. These are obtained from Morton International, Inc., Seabrook, N.H., and include Morthane PE199-100, PE193-100, PE192-100, and PN3429-100, by way of illustration but not by way of limitation. These polymers are characterized by excellent resilience, good low temperature flexibility, superior color stability, and outstanding UV stability. Most importantly, the plastic selected must have surface adhesion characteristics such that they are capably of releasably adhering to themselves.

Preferably, the autogenously adhesive plastic sheet 32 comprising the guide 30 is approximately 8 mils thick. The thickness of the plastic used is significant because it must not interfere with the student's fingers or hand position when playing the instrument. It is important that the plastic be thick enough to avoid stretching and tearing when it is warmed during playing, but it must be thin enough to avoid creating an unnatural feeling in the hands of the student when applied to the instrument. The most important feature of the plastic used to construct the guide of the present invention is that it be autogenously adhesive, namely, that it be capable of sticking to itself without application of an adhesive.

For most guitars, the autogenously adhesive plastic sheet 32 comprising the guide 30 should be at least six (6) inches wide to encircle the neck of the instrument. The appropriate width of the guide 30 for other instruments can be determined by measuring the circumference of the fingerboard at several points along its length, and allowing for additional material so that the side wings of guide 30 will overlap, preferably ¼ to ⅜ of an inch minimum, when the guide 30 is applied to the neck of the instrument.

In the preferred embodiment of the present invention, the printed indicia of the prior art is replaced with dynamic electrically controllable lamps or similar which can be turned on or off according to the requirements of a music teaching lesson plan. Obviously, the present invention may have more or fewer dynamic indicia for various keys and/or various instruments. For example, guitars come with different numbers of strings and violins are different than guitars. Also some players string their guitars for left-handed use which require a guide having a reversed pattern. A left/right configuration of the guide would have excess indicia to permit both left and right patterns to be displayed on the same guide.

The present invention obviously differs from the prior art in that there is an active layer comprising the wiring and electrical indicators. It is possible to treat at least the back (opposite the viewing side) to provide autogenously adhesiveness. However, the preferred method is to laminate the back and front sides each with a layer of plastic having autogenously adhesive properties. The front side layer also serves to protect the delicate wiring and indicia elements.

Figure 5:
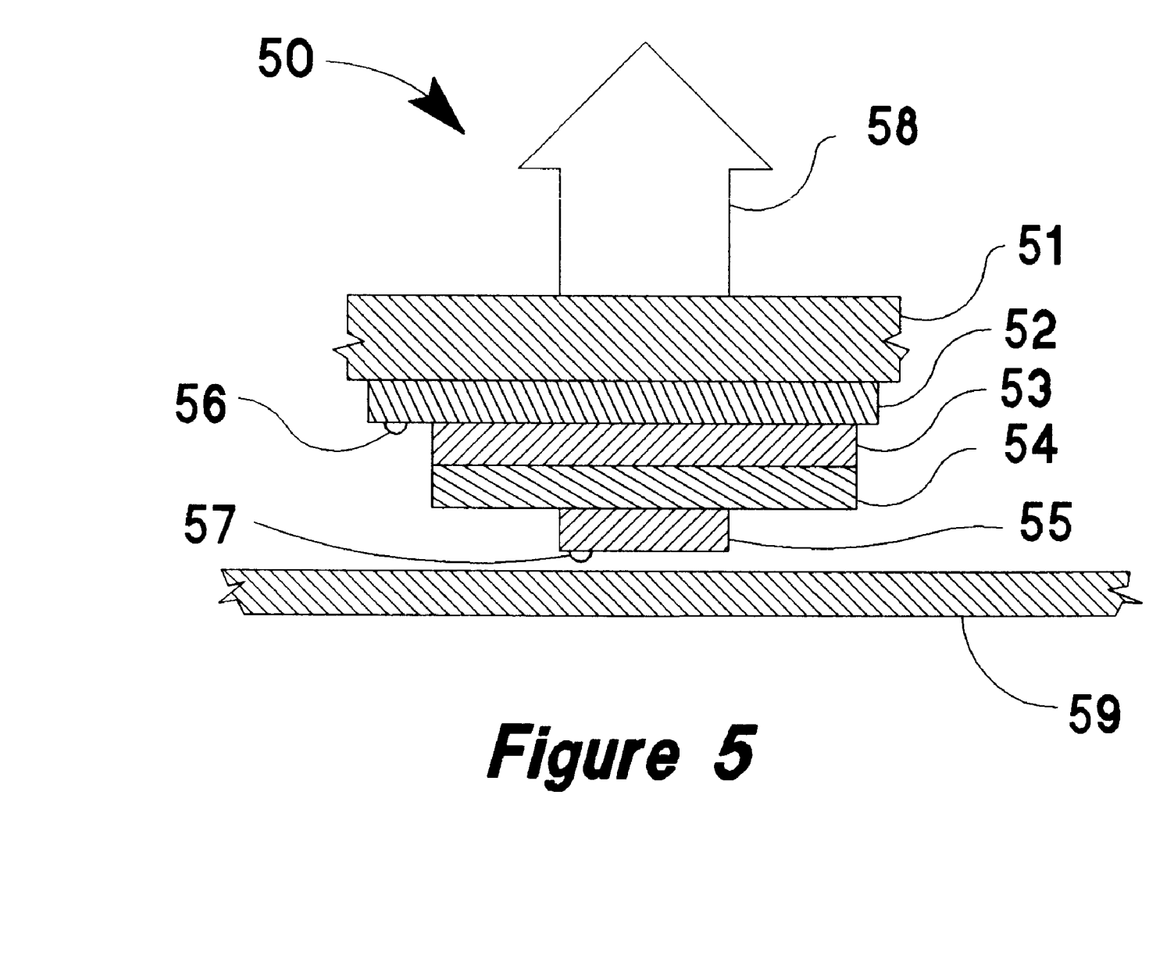
FIG. 5 is a cross section of an indicator using plastic LED's

The indicator layer may use any relatively thin, preferably flexible elements, such as flexible light emitting polymer LED's 50 as shown in FIG. 5. Similarly, liquid crystals and optical shutters can be made thin. The active, light producing parts of a standard LED are tiny squares of small thickness, encased in a thicker case of translucent plastic. Standard LED's would cause significant lumps to appear on the surface of the indicator layer. These lumps would interfere with the natural feel and operation of depressing an instruments string against the indicator layer. The standard LED would also be subject to damage by the depressed string repeatedly contacting the surface lump created by the LED itself.

There are two techniques for controlling reflected light for use displays. Conventional front, ambient light, illuminated liquid crystals reflect or absorb in the crystal layer. The other technique is similar except that the active layer is a transparent/opaque window over a reflecting background. Both techniques can be described as controlled-reflectivity display elements.

Current LED technology includes a surface emitting embodiment which would be preferred over the usual edge emitting embodiments.

Another embodiment would be to use fiber optics to conduct light from lamps located away from the point of indication to the appropriate indicating locations. Fiber optics do not have to be round "light pipes", but may be constructed as ribbons either separately or integrally with a carrying sheet.

The preferred embodiment for constructing the indicator layer using flexible light emitting polymer LED's 50 as shown in FIG. 5. A transparent substrate 51, here used as a cover sheet, with or without an overlaying protective sheet, is underlain with a transparent electrode 52, a pair of conjugated polymers 53 53 such as polyanaline or polypyrrole, and an electrode layer 54, and appropriate electrical contacts 56 57. The light emitting assembly 50 is assembled on a bottom layer 59, at least part of which (wings 44) has the autogenous adhesive properties for attaching to a stringed instrument neck. When energized light 60 is generated and exits through the transparent substrate and transparent electrode. Such material and complete display panels are manufactured by Cambridge Display Technologies, Limited of Cambridge, England. The technology is described in Cambridge Display patents U.S. Pat. No. 5,399,502 and U.S. Pat. No. 5,247,190.

The Cambridge Display flexible plastic display elements can be fabricated in a large variety of colors. This is a distinct advantage over conventional LED light sources as they can be made in only a limited number of colors, primarily red, orange, yellow, green, and light blue. It is known that some persons with severe red-blind color blindness cannot see the common essentially monochromatic red LED.

The several appropriate technologies, whether light emitting devices, light transmission shutters, or controlled reflectivity devices, all provide two basic modes of display. A portion under control of an electrical signal are in either emphasized (bright) or subdued (dim) mode. That is, the status of the indicator is essentially either on or off, although some devices and connections may result in an indicator being partially "on". In any case, the distinction between on and off is readily apparent to the instrument player.

Since some metallic light emitting diodes and the plastic light emitting devices may be constructed and wired to display more than one color, the indicated spots or locations may be have on modes of selected colors as well as simple bright and dim status.

Figure 4:
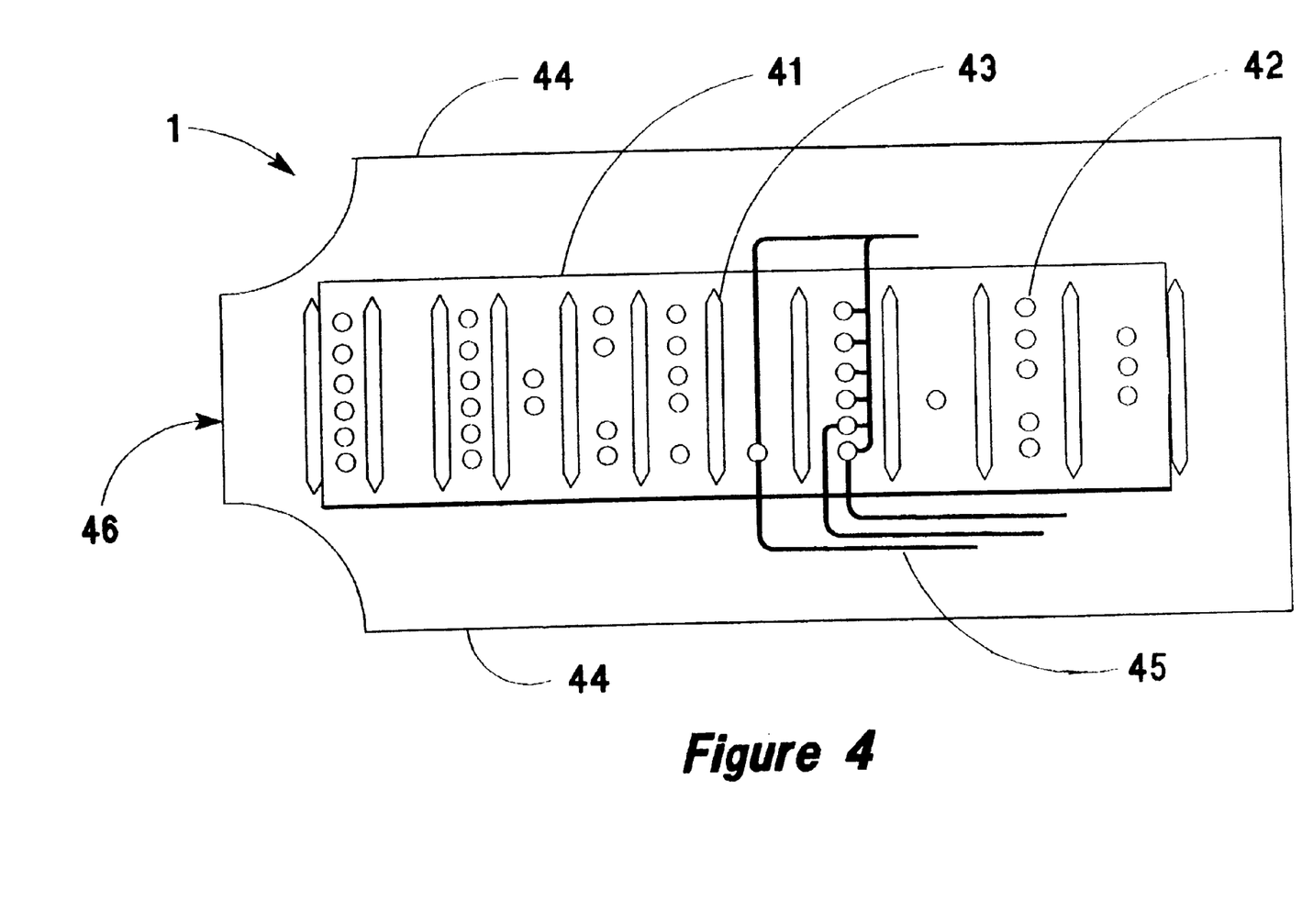
FIG. 4 is the dynamic fingering guide

As shown in FIG. 4, the fingering guide 1 consists of a base sheet 46, indicia 42, fret slots 43, flexible "printed circuit" interconnecting wiring 45, and a pair of autogenous attaching wings 44.

Figure 6:
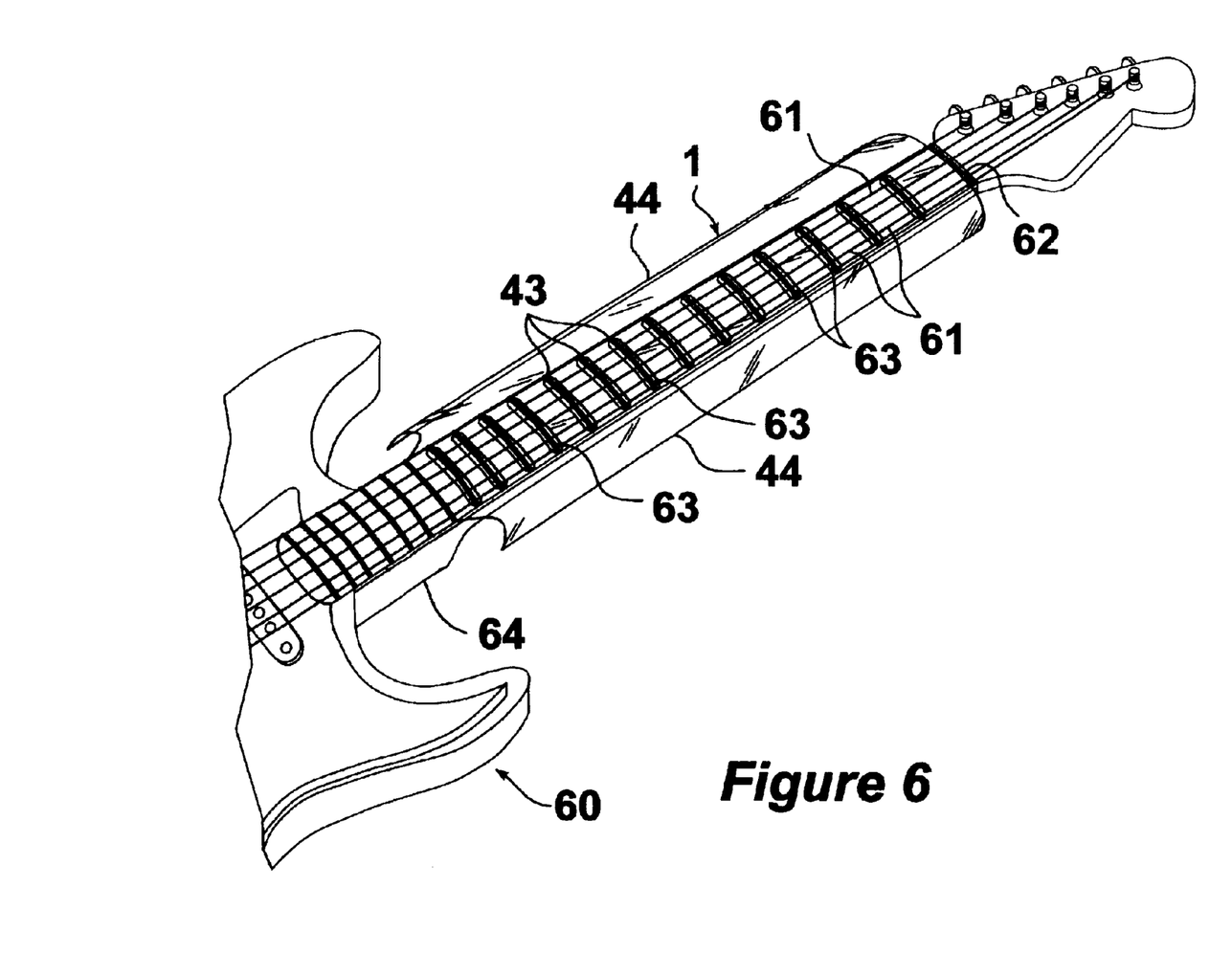
FIG. 6 is the fingering guide applied to a guitar

Referring to FIGS. 4 and 6, it is preferred, but not necessary that the indicia portion of the present invention 41 be as flexible as the portion used to wrap and secure the finger position guide 1 to the neck 64 of the instrument 60. There is no overriding need for flexibility under the strings 61, therefor that portion of the panel may be made stiff in comparison to the wrap wings 44.

How to Use the Invention

To use the invention on a guitar, the slots in the indicator face are placed over the frets 63 starting with the first fret next from the nut 62 at the distal end of the guitar and then wrapped around the neck of the instrument. Wings 44 overlap and cling to each other and often to the guitar neck as well, thereby the guide 1 is secured to the instrument. Removal is simply the reverse, unwrapping the wings and lifting the guide from the instrument.

While the above description is based on stringed instruments described in the Background Section, there is no restriction against using the present invention on similar instruments without sounding boards, chambers, "f" holes, etc, such as electric guitars and electric violins, or even instruments without string necks such as zithers. It is obvious to any reasonably skilled in the art that autogenously adhesive materials will cling to material other than itself. Therefore, the disclosed invention may be adapted to many instruments where there is a surface in proximity to the fingering position. On a zither, dulcimer, or similar, the place is the board under the strings. On a keyboard instrument such as a piano, there is usually a flat board immediately behind the keys upon which the indicator sheet may be attached.

While the preferred embodiments of the invention have been illustrated and described, it will be appreciated that various changes can be made therein without departing from the spirit and scope of the invention as defined in the appended claims.

What is claimed is:

1. A finger positioning guide for dynamic indication of finger placement locations on the fingerboard of a stringed instrument comprising:
   a. a stringed instrument having an elongated neck with a circumference and a fingerboard, and;
   b. a sheet of autogenously adhesive plastic having a width greater than the circumference of said elongated neck and adapted to surround said circumference and;
   c. said sheet having at least one dynamic finger positioning marker and;
   d. wherein said dynamic positioning marker has at least two electrically operated modes selected from the group consisting of emphasized and subdued modes, and;
   e. wherein said sheet and marker is positioned over the said fingerboard and wrapped around said neck and substantially conforming to said neck and said sheet overlapping itself whereby said sheet adheres to itself, thereby being removably attached to said stringed instrument, with said marker indicating the position to place a finger on said fingerboard and said markers are selectively energized for enhanced contrast and visibility.

2. The dynamic indication of finger placement location marker of claim 1 is an electrically operated source of visible light.

3. The dynamic indication of finger placement location marker of claim 1 is a reflective zone where the reflectivity is controlled by an electrical signal.

4. The dynamic indication of finger placement guide of claim 1 further comprising a plurality of finger positioning markers.

5. The dynamic indication of finger placement finger positioning markers of claim 4 further comprising markers in groups wherein the members of the group together indicate the finger positions for sounding chords on said instrument.

6. The dynamic indication of finger placement finger positioning markers of claim 4 mark the finger positions for sounding groups of notes comprising musical scales.

7. The dynamic indication of finger placement finger positioning markers of claim 4 further comprising markers having annotation for indicating the note corresponding to the finger position, and;
   said annotation is at least one means selected from the group comprising color, letter, and number, and;
   said letter and number annotation is rotated to read in the normal attitude for letters and numbers when said instrument is played in the usual diagonal orientation across the instrument users body, thereby improving the readability of said number and letters.

8. A finger positioning guide for dynamic indication of finger placement locations on the fingerboard of a stringed instrument comprising:
   a. a stringed instrument having an elongated neck and a fingerboard with frets and;

b. a plurality of dynamic finger positioning markers further comprising markers in groups wherein the members of the group together can indicate the finger positions for sounding chords on said instrument.
c. the dynamic finger positioning markers further comprising markers in groups wherein the members of the group together can indicate the finger positions for sounding scales on said instrument.
d. a sheet of plastic having openings adapted to receive frets therethrough and;
e. wherein said sheet is positioned over the said fingerboard with said frets extending through said openings and wrapped around said neck and substantially conforming to said neck and said sheet overlapping itself whereby said sheet adheres to itself, thereby being removably attached to said stringed instrument, with said dynamic markers indicating the position to place a finger on said finger board and;
f. wherein the operative alignment of the finger positioning guide on the instrument is established by the frets extending through the finger positioning guide.

9. The dynamic finger positioning markers of claim 8 further comprising markers having annotation for indicating the note corresponding to the finger position, and;

said annotation is at least one means selected from the group comprising color, letter, and number, and;

said letter and number annotation is rotated to read in the normal attitude for letters and numbers when said instrument is played in the usual diagonal orientation across the instrument users body, thereby improving the readability of said number and letters.

10. A finger positioning guide for dynamic indication of finger placement locations on the fingerboard of a stringed instrument comprising:

a. a stringed instrument having an elongated neck with a circumference and a fingerboard, and;
b. a sheet of plastic having a central portion adapted to carry a plurality of electrically operated lighted dynamic finger positioning markers embedded therein and having a width greater than the circumference of said elongated neck and adapted to surround said circumference, and;
c. said sheet further comprising at least one autogenous portion on each side of said marker carrying portion whereby when said sheet surrounds said neck said autogenous portions overlap and adhere to each other, whereby said central portion of said sheet is removably attached to said neck of the stringed instrument with the central portion under the instrument strings, and;
d. said lighted finger positioning markers having an upper surface from which light is emitted, and said central portion having an upper surface, where said lighted finger positioning markers are fixedly embedded into said central portion with said markers, upper surfaces being essentially flush with said upper surface of the central portion, and;
e. said lighted finger positioning markers have at least two operating modes selected from the group consisting of emphasized and subdued modes, and;
f. whereby said sheet with said markers is positioned over the said fingerboard and wrapped around said neck, substantially conforming to said neck, and said sheet overlapping itself whereby said sheet adheres to itself, thereby being removable attached to said stringed instrument, with said markers indicating the positions to place fingers on said fingerboard and said markers are selectively energized for enhanced contrast and visibility.

11. The dynamic finger positioning markers of claim 10 are electrically operated light emitting polymer devices.

12. The dynamic finger positioning markers of claim 10 further comprising markers in groups wherein the members of the group together indicate the finger positions for sounding chords on said instrument.

13. The dynamic positioning markers of claim 10 indicate the finger positions for sounding groups of notes comprising musical scales.

14. The dynamic positioning markers of claim 10 further comprising annotation for indicating the note corresponding to the finger position and said annotation is at least one means selected from the group comprising color, letter and number.

15. Said letter or number annotation of claim 14 is rotated to read in the normal attitude for letters and numbers when said instrument is played in the usual diagonal orientation across the instrument users body, thereby improving the readability of said number and letters.

* * * * *